Oct. 22, 1940.   R. J. BUSH ET AL   2,218,600
BRAKE MECHANISM
Filed March 25, 1939   2 Sheets-Sheet 1
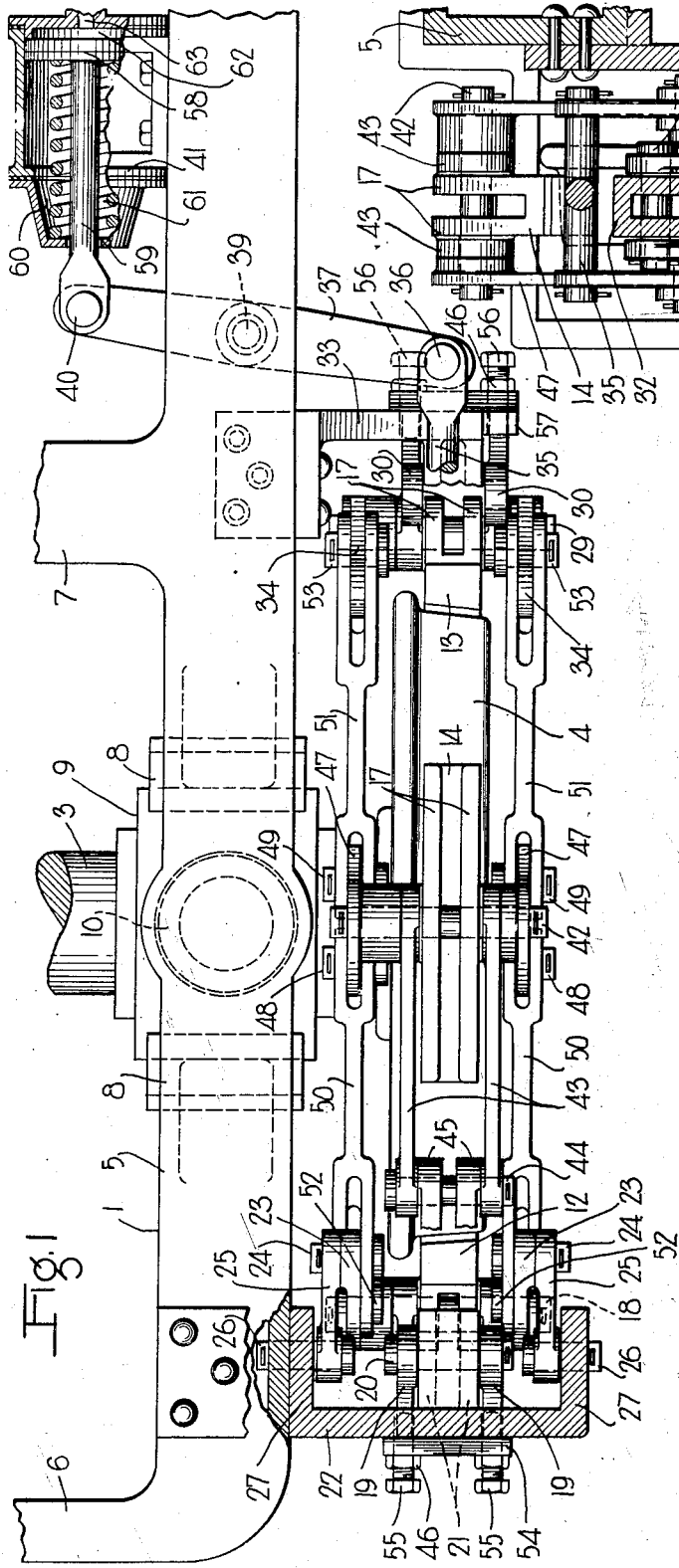
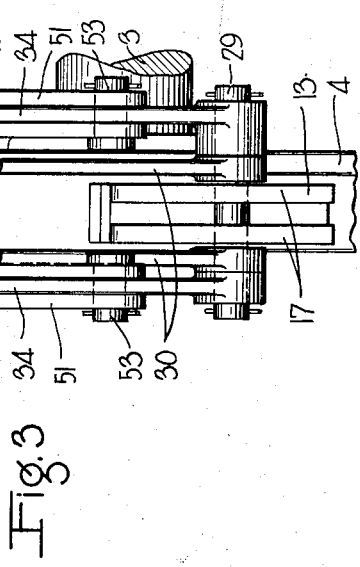
INVENTORS
RANKIN J. BUSH
WILLIAM H. GLASS
BY
ATTORNEY

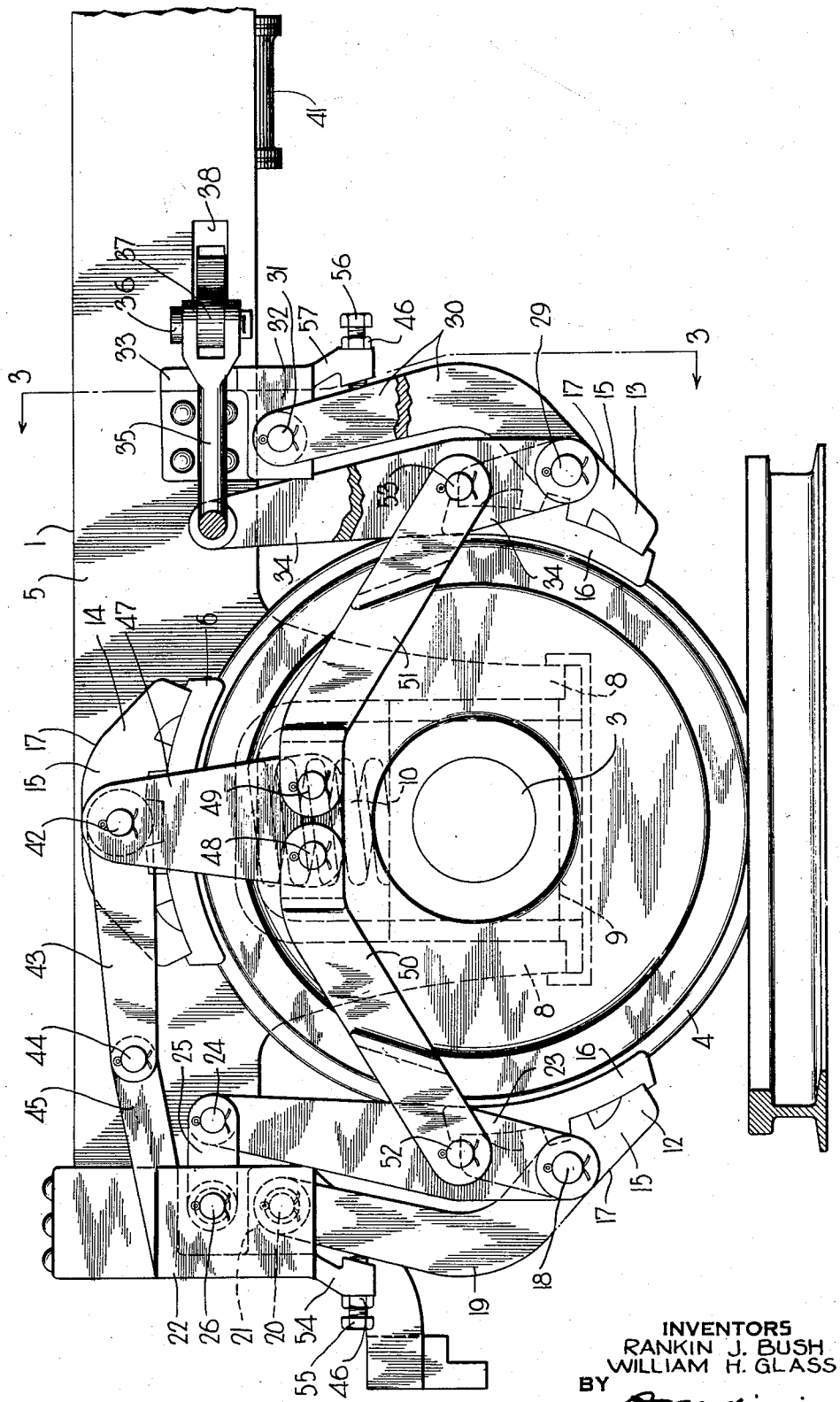

Patented Oct. 22, 1940

2,218,600

UNITED STATES PATENT OFFICE 2,218,600

BRAKE MECHANISM

Rankin J. Bush, Jeannette, and William H. Glass, Pittsburgh, Pa., assignors to The Westinghouse Air Brake Company, Wilmerding, Pa., a corporation of Pennsylvania Application March 25, 1939, Serial No. 264,168

20 Claims. (Cl. 188—56)

This invention relates to brake rigging or mechanism and more particularly to the general type disclosed in the pending application of Carlton D. Stewart, Serial No. 214,517, filed June 18, 1938, now Patent No. 2,177,953, dated Oct. 31, 1939, which embodies a plurality of brake elements arranged in clasp relation at opposite sides of a wheel and axle assembly and one or more additional brake elements disposed above said assembly and cooperative with said clasp arranged elements for braking said assembly.

In the brake mechanism disclosed in the above referred to application all of the brake elements are connected to a relatively long, heavy beam which extends longitudinally of the truck frame. One end of this beam is pivotally connected to the truck frame while a spring acts on the opposite end to support the beam and thereby the several brake elements from the truck frame when the brakes are released.

The clasp arranged brake elements are so disposed as to engage the wheel and axle assembly below the horizontal center line thereof, so that when forced against said assembly in effecting an application of the brakes the brake elements will move downwardly around the assembly to a certain degree and in so moving rock the beam about its pivotal connection with the truck frame and thus pull the additional brake element or elements located above the assembly and carried by the beam into braking engagement with said assembly. The additional brake element or elements then act through the beam to support the clasp arranged elements in braking relation with the assembly and the beam merely acts to hold the several brake elements against turning with said assembly.

In trucks such as are employed under modern railway vehicles having low centers of gravity, there is little available space for the installation of brake systems, and on certain trucks it might even be impossible to install a brake mechanism which included a long heavy beam such as above described. One object of the present invention is therefore to provide a novel brake mechanism of the above general type in which the need for such a beam is obviated.

Another object of the invention is to provide a novel brake rigging embodying clasp arranged brake elements supported directly from the truck frame in the usual manner, and one or more additional brake elements operatively connected to the clasp brake elements through a toggle system of links and levers so arranged as to operate the additional brake element or elements into and out of braking engagement with the assembly upon operation of the clasp brake elements, and for supporting the additional brake element or elements from the clasp brake elements when the brakes are released.

According to these objects the live and dead levers employed for operating the clasp brake elements in the usual manner are operatively connected to opposite ends of a toggle arrangement of links instead of to the usual tie rod, while the additional brake element or elements is operatively connected to the knee of the toggle. By this arrangement the toggle is adapted to transmit braking force for operating the clasp brake elements in the same manner as through the tie rod heretofore employed, and in addition is operative through the knee of the toggle to draw the addtitional brake element or elements into braking engagement with the assembly.

The toggle employed in this brake rigging may be so designed that the additional brake element or elements will provide the same degree of braking as each of the clasp brake elements, or any other desired degree, since the degree of braking obtained from the additional brake elements is a function of the angle between the arms of the toggle at opposite sides of the toggle knee.

Since in this novel brake rigging a portion of the braking is provided by the additional brake element or elements, it will be evident that the force with which the clasp brake elements are pressed against the wheel and axle assembly, and thus the diameter of the operating brake cylinder, need not be as great as required to produce the same degree of braking with a simple two shoe clasp brake arrangement of conventional design. The smaller brake cylinder required for use with this novel brake mechanism will therefore reduce the amount of compressed air required for controlling the braking operation, as is very desirable, while the lower force required for operating the brake elements of this new brake mechanism will reduce wear of said elements and also result in less heating of the brake elements during braking, and thus provide a more uniform braking of the truck.

Other objects and advantages will be apparent from the following more detailed description of the invention.

In the accompanying drawings: Fig. 1 is a plan view, partly in section, of a portion of a railway vehicle truck and a novel brake mechanism embodying features of the present invention applied thereto; Fig. 2 is a side elevational view of same; and Fig. 3 is a sectional view taken on the line 3—3 of Fig. 2.

Description

As shown in the drawings, the invention as associated with a railway vehicle truck which for the purpose of illustration may comprise the usual truck frame I and longitudinally spaced wheel and axle assemblies each of which may comprise an axle 3 and laterally spaced wheels 4 secured in any desired manner to the axle 3 for rotation therewith.

The truck frame 1 comprises side pieces 5 disposed between the wheels 4 and integrally connected together by transversely extending end members 6 and transoms 7. The side pieces 5 are provided adjacent each wheel 4 with the usual spaced, depending pedestals 8 between which is slidably mounted a journal bearing 9 journaled on the axle 3. A spring 10 is interposed between each journal bearing 9 and side piece 5 for resiliently supporting the truck frame 1.

Each wheel and axle assembly of the truck may be provided with two brake mechanisms, hereinafter fully described, and both of these brake mechanisms may be substantially identical to each other and operate in the same manner. In view of this and for the sake of simplicity, only one such brake mechanism and the necessary portions of one wheel and axle assembly and of the truck frame are shown in the drawings.

The novel brake mechanism comprises a plurality of friction brake elements 12, 13 and 14 arranged in circumferentially spaced relation about a member to be braked, which member in the present embodiment of the invention, is preferably the wheel 4 of the truck. The brake elements 12 and 13 are arranged in clasp relation at opposite sides of the wheel 4 with the longitudinal centers of their braking faces disposed below the horizontal center line of the wheel 4, while the brake element 14 is located above said wheel on the vertical center-line thereof.

Each of the brake elements 12, 13 and 14 may be of usual structure comprising a brake head 15 provided on its outer surface with parallel supporting flanges 17 extending longitudinally thereof. A brake shoe 16 is removably secured to the opposite face of each of the brake heads 15 in operating alignment with the tread of the wheel 4 for frictionally engaging said tread to brake said wheel.

The clasp brake element 12 is mounted on a pin 18 which extends through suitable apertures provided in the flanges 17 of the brake head 15 and secured to this pin outside of said flanges are one end of two oppositely disposed, like, brake hangers 19. The opposite ends of these hangers are pivotally connected to a pin 20 which is secured in two spaced lugs 21 projecting from a bracket 22 which extends outwardly from the side piece 5 of the truck frame adjacent the end member 6. A pair of like, substantially vertically disposed dead levers 23 are provided, one outside of each of the brake hangers 19. The lower ends of the dead levers are pivotally connected to the brake shoe pin 18, while the upper end of each is connected by a pin 24 to one end of a link 25, the opposite end of which is pivotally connected by the pin 26 to an end flange 27 of the bracket 22.

The clasp arranged brake shoe 13 is supported on a pin 29 extending through the flanges 17 of the brake head 15 of said elements. A pair of parallel arranged hangers 30 are provided having one end pivotally connected to the pin 29 at opposite sides of the brake element 13 while the opposite ends of said hangers are pivotally connected by a pin 31 to a lug 32 projecting from one side of a bracket 33 which is secured to and extends outwardly from the side piece 5 of the truck frame at the side of wheel 4 opposite bracket 22. A pair of oppositely disposed live brake levers 34 are provided one at either side of the two hangers 30. The lower end of these live brake levers are pivotally connected to the pin 29, while the opposite ends of said levers are operatively connected to the opposite ends of the head of a T-shaped link 35, the opposite end of said link being pivotally connected by a pin 36 to one end of a brake lever 37.

The brake lever 37 is disposed to operate in a horizontal plane in an opening 38 provided through the side piece 5 of the truck frame. Intermediate its ends the lever 37 is pivotally connected to a fulcrum pin 39 secured in the piece 5 of the truck frame, and the opposite end of said lever is connected by a pin 40 to a brake cylinder device 41 secured to the truck frame inside of said side piece.

The brake element 14, located above the wheel 4, is carried on a pin 42 which extends through the flanges 17 on the brake head 15 of said element. A torque arm 43 is provided at each of the opposite sides of the brake element 14. Each of these torque arms is pivotally connected at one end to the pin 42 while the opposite end is pivotally connected to a pin 44 which is carried in two spaced lugs 45 extending outwardly from the bracket 22.

It will be noted that the brake element 15 is shown in Fig. 2 slightly spaced from the tread of the wheel 4 and that the lugs 45 are so arranged that when said brake element is moved into engagement with said wheel the torque arms 43 will be substantially horizontally disposed. This disposition will of course vary according to the vertical position of the truck frame 1 with respect to the wheel 4, however, the various parts are so arranged that the angularity of said torque arm with respect to the horizontal will be as small as possible for the various changes in elevation of the truck frame.

A depending link 47 is pivotally mounted on the pin 42 adjacent the outer face of each of the torque arms 43. The lower end of each of these links is pivotally connected by pins 48 and 49 to two, oppositely disposed, downwardly and diagonally extending links 50 and 51. The opposite end of each of the links 50 is bifurcated and pivotally connected by a pin 52 to one of the dead levers 23, intermediate the ends of said lever and closer to the pin 18 than to the link 25. Each of the oppositely disposed links 51 has its lower end bifurcated and pivotally connected by a pin 53 to one of the live levers 34 intermediate its ends but closer to the pin 29 than to the link 35.

The links 47, 50 and 51 constitute a toggle the opposite ends of which are connected to the live and dead levers 34 and 23 while the knee of the toggle is connected through the pin 42 to the brake element 14 disposed above the wheel 4.

Depending from the bracket 22 is a lug 54 and screw-threaded into this lug in line with the outer edges of the two hangers 19 are a pair of adjusting screws 55. A pair of like screws 56 are provided in a lug 57 depending from the bracket 33 and in line with the outer edges of the hangers 30. The adjusting screws 55 and 56 are provided for engagement with the hangers 19 and 30 respectively upon movement of the brake elements 12 and 13 away from the tread of the wheel 4 to define the clearance space between said elements and tread, and by proper adjustment of said screws said clearance space may be adjusted to any desired degree. A lock nut 46 is provided on each of the screws 55 and 56 for securing said screws in an adjusted position.

The brake cylinder device 41 comprises a casing secured to the side piece 1 of the truck frame. A brake cylinder piston 58 is slidably mounted in the casing and is provided with a piston rod 59 secured to the piston for movement therewith and extending through the end of the casing. The outer end of the piston rod 59 is pivotally connected to the pin 40 secured in the brake lever 37.

The brake cylinder piston 58 has at the side containing piston rod 59, a non-pressure chamber 60 which is open to the atmosphere in any desired manner. A release spring 61 is provided in the non-pressure chamber 60 and acts on the brake cylinder piston 58 for effecting movement thereof to its release position, and in so moving is adapted to operate the brake lever 37 to move the several parts of the brake mechanism to their release positions, in which the several parts are shown in the drawings and which will be hereinafter more fully described. The brake cylinder piston 58 is provided at its opposite face with a pressure chamber 62 which is open to a passage 63 provided in the casing. This passage is adapted to be connected to the usual brake cylinder pipe (not shown) through which fluid under pressure is adapted to be supplied to and released from pressure chamber 62 in any desired manner.

Operation

Assume that the several parts of the brake mechanism are in their release positions, as shown in the drawings, in which positions the brake elements 12, 13 and 14 are all spaced away from the tread of the wheel 4 so that said wheel is free to rotate.

If it is desired to brake the wheel 4, fluid under pressure is supplied through the passage 63 to the pressure chamber 62 in the brake cylinder device. This pressure acting on the brake cylinder piston 58 overcomes the pressure of spring 61 and moves said piston and thereby the piston rod 59 in such a direction as to turn the brake lever 37 in a counterclockwise direction, as viewed in Fig. 1 of the drawings. This movement of the lever 37 is transmitted through the link 35 to the live brake levers 34 and acts to rock said levers in a clockwise direction, as viewed in Fig. 2. The initial rocking movement of the live levers 34 is about the pin 29 carrying the brake element 13 and thus acts to move the pins 53 connected to the toggle links 51 away from the pins 52 connected to the toggle links 50. As the pins at the ends of the toggle links 50 and 51 are thus moved apart, the brake element 14 is lowered by gravity into engagement with the tread of the wheel 4 and then acts to prevent further downward movement of the brake pins 48 and 49 provided at the knee of the toggle.

After the brake element 14 is thus moved into engagement with the tread of the wheel 4, the pins 53 at the one end of the toggle links 51 become the fulcrums for the live levers 34, so that further movement of said levers acts to rock the hangers 30 about the pivot pin 31 in such a direction as to move the brake element 13 into engagement with the wheel 4. After the brake element 13 is moved into contact with the wheel the pivot pin 28 again becomes the fulcrum for the live levers 34 so that further movement of said levers acts through the toggle links 50 and 51 and connecting pins 48 and 49 on the pins 52 connecting the links 50 to the dead levers 23. The force thus applied to the pins 52 acts to rock the dead levers 23 about their fulcrum connections with the bracket 22 through the links 25, in such a direction as to swing the hangers 19 toward the wheel 4 for thereby moving the brake element 12 into engagement with the tread of said wheel.

After the brake elements 12, 13 and 14 are thus all moved into contact with the tread of wheel 4, the pressure applied by the brake cylinder piston 58 to the live levers 34 acts through the toggle links 47, 50 and 51 to force the several brake elements into braking engagement with the tread of the wheel 4 to effect braking thereof. The degree of this force depends upon the pressure of fluid supplied to act on the brake cylinder piston 58, and this pressure may be varied in the usual manner to provide any desired degree of braking of the wheel.

It will be evident that the pressure with which the brake element 13 is forced against the wheel is governed by the moment arms of the live levers 34 at either side of the pin 53. The same degree of pressure as applied to the pins 53 for forcing the brake element 13 into engagement with the wheel is transmitted through the toggle links 51, 47 and 50 to the pins 52 for operating the dead levers 23 to force the brake element 12 into engagement with the wheel, and assuming that the moment arms of said dead levers are the same as of the live levers 34 the brake element 12 will be forced into engagement with the wheel with the same degree of force as the brake element 13. In other words the toggle transmits substantially the same pressure for operating the brake element 12 as provided for operating the brake element 13.

The vertical component of the pressure applied to the opposite ends of the toggle links 50 and 51 is transmitted through the links 47 to the pin 42 for forcing the brake element 14 into braking engagement with the top of the wheel 4. This component of force depends upon the angularity of the oppositely disposed toggle links 50 and 51, the same as in any toggle mechanism. The angularity in the particular construction shown depends upon the length of the links 47 which may be such as to provide any desired degree of braking of the brake element 14. The length of the links 47 may, if desired, be such as to obtain the same degree of braking from the element 14 as obtained from the elements 12 and 13, assuming that the brake mechanism is so arranged that both of the elements 12 and 13 brake equally. It will of course be understood that the degree of braking provided by the brake element 14 is not governed by that provided by either of the elements 12 and 13, but rather is a function of the angle between the toggle links 50 and 51.

Due to the fact that the clasp brake elements 12 and 13 engage the wheel 4 below the horizontal center-line thereof and that the actuating force applied thereto acts in a direction substantially parallel to said center-line, said clasp brake elements tend to be forced downwardly around the wheel in the same manner as occurs in conventional type of brake rigging and which in conventional brake rigging results in a less effective brake for a certain actuating pressure. Such downward movement of the clasp brake elements 12 and 13 is however prevented in the present construction since the brake element 14 acts through the toggle links 47, 50 and 51 to support the clasp brake elements 12 and 13 in substantially the same position relative to the wheel 4 as obtained upon initial engagement with said wheel. Any degree of the downward pull of the clasp brake elements 12 and 13 which may be taken by the hangers 19 and 30 and transmitted to the truck frame 1 has no material effect upon the vertical position of said frame which therefore remains, when the brakes are applied, in substantially the same position as occupied when the brakes are released. It will therefore be evident when the brakes on the truck are applied the clasp brake elements 12 and 13 are supported by the brake element 14 in the positions for providing desired effectiveness and for rendering said elements promptly responsive to any changes in actuating force.

When the brakes are applied the torque arms 43 act to hold the brake element 14 against movement with the wheel 4, and acting through the toggle links 47, 50 and 51 also hold the brake elements 12 and 13 against turning with the wheel 4, as will be apparent.

In order to effect a release of the brakes after an application, the fluid under pressure is released from the brake cylinder pressure chamber 62 and when said pressure is reduced sufficiently, the release spring 61 acts to move the brake cylinder piston 58 back toward its release position shown in the drawings. This movement of the brake cylinder piston acts through the piston rod 59, brake lever 37 and link 35 to release pressure on the entire brake mechanism and to then rock the live levers 34 in a clockwise direction.

As the live levers 34 are thus moved, the clasp brake elements 12 and 13 swing away from the wheel 4, due to the action of gravity, until the supporting hangers 19 and 30 engage the adjusting screws 55 and 56, respectively, which define the release positions of said elements.

After the brake elements 12 and 13 are thus moved to their release positions, further release movement of the live levers 34 by the brake cylinder release spring 61, acts through the links 51 and 50 on the links 47 to elevate the brake element 14 to its release position disengaged from the wheel 4, as shown in the drawings, said position being attained upon completion of the release movement of said piston. The wheel 4 is now again free to rotate.

It will be evident that since all of the brake elements are supported during braking in the same positions as occupied upon the initial movement into contact with the wheel 4, any reduction in the pressure of fluid acting on the brake cylinder piston 62 will promptly result in a proportional reduction in the degree of braking. Hence, the brakes on the wheel 4 may be graduated off, if desired, in any desired steps. The release of the brakes on the wheel 4, as well as the application, is therefore adapted to be controlled accurately to any desired degree with this novel brake mechanism.

The particular sequence of movement of the several brake elements 12, 13 and 14 into and out of engagement with the wheel 4 in effecting an application and a release of the brakes is immaterial and a mere matter of design, since it may vary according to the relative masses of the various elements of the brake mechanism and according to the fulcrum connections, such as provided on the pins 20 and 21 with respect to the parts of the brake mechanism supported from said pins. It is only essential in effecting an application of the brakes that all of the brake elements be brought into braking engagement with the wheel and in effecting a release of the brake that all of said elements be disengaged from said wheel, regardless of which one of the elements operates first or last.

All of the brake operating levers, hangers, links and the torque arms 43 are preferably arranged in pairs at opposite sides of the several brake elements, as hereinbefore described and shown in the drawings, in order to apply the same equalized pressure to both sides of said elements and thereby insure maximum and most efficient and uniform braking of said elements against the wheel 4.

While the invention has been shown and described as arranged for braking a vehicle wheel, for the purpose of illustrating one application thereof, it will be evident that it is equally well adapted to brake any rotatable member, such as a brake drum secured to the axle 3, if desired.

*Summary*

From the above description it will be noted that the novel brake mechanism is arranged to be applied to a vehicle truck in the limited space provided immediately adjacent one of the truck wheels, the novel toggle operating connection between the clasp brake elements being disposed substantially in the space hereinbefore occupied by the usual tie rod employed for operating clasp brake elements of conventional design.

These toggle connections provide for the operation of an additional brake element which may be employed to provide either an increased degree of braking for the same actuating or brake cylinder force or a reduction in the degree of braking of the clasp brake elements with a corresponding reduction in the actuating force.

A further advantage obtained from the additional brake element is that it acts, when the brakes are applied, through the toggle connection to support the clasp brake elements in substantially the position relative to the wheel obtained upon movement into braking engagement therewith. Due to this, the tendency of the truck frame to move vertically relative to the wheel, due to the wheel striking irregularities in the track or the like, is substantially obviated and will therefore have no effect upon the position of the clasp arranged brake elements relative to the wheel, and said elements will therefore be maintaind in a position to immediately respond to any change in the degree of application or release of the brakes. This is very desirable, as above explained, in that it provides for a very fine and accurate or flexible control of the degree of braking of the wheel 4.

While one illustrated embodiment of the invention has been described in detail, it is not the intention to limit it to that embodiment or otherwise than by the terms of the appended claims.

Having now described our invention, what we claim as new and desire to secure by Letters Patent, is:

1. A brake mechanism for a railway vehicle truck having a rotatable member adapted to be braked for braking said truck and provided with an annular braking surface, said mechanism comprising at least three friction brake elements arranged in spaced relation around said rotatable member and adapted to frictionally engage said surface for braking said truck, means for supporting two of said brake elements against movement with said surface upon engagement therewith, actuating means operatively connecting all of said brake elements for directly actuating each of said brake elements, and means for controlling the operation of said actuating means.

2. A brake mechanism for a railway vehicle truck having a rotatable member adapted to be braked for braking said truck and provided with an annular braking surface, said mechanism comprising at least three friction brake elements arranged in spaced relation around said member and adapted to frictionally engage said surface for braking said truck, means for supporting two of said brake elements against movement with said surface upon engagement therewith, actuating means for actuating one of said brake elements, and means connecting said one brake element to the other two brake elements and operative by said actuating means to directly operate said other two brake elements, and means for controlling the operation of said actuating means.

3. A brake mechanism for a railway vehicle truck having a rotatable member adapted to be braked for braking said truck and provided with an annular braking surface, said mechanism comprising at least three friction brake elements arranged in spaced relation around said member and adapted to frictionally engage said surface for braking said truck, a lever for each of two of said brake elements having a pivotal connection therewith, means operatively connected to said levers at points spaced from said connections and connected to the third brake element, and actuating means for operating said levers and thereby said means to effect braking operation of said brake elements.

4. A brake mechanism for a railway vehicle truck having a rotatable member adapted to be braked for braking said truck and provided with an annular braking surface, said mechanism comprising at least three friction brake elements arranged in spaced relation around said member and adapted to frictionally engage said surface for braking said truck, a lever having a pivotal connection with one of said brake elements and operative to force same into braking engagement with said surface, and means pivotally connected to said lever at a point remote from said connection and pivotally connected to another of said brake elements and operative by said lever to force said other brake element into braking engagement with said surface, said means being connected to the third of said brake elements for actuating same upon operation of said actuating means.

5. A brake mechanism for a railway vehicle truck having a rotatable member adapted to be braked for braking said truck and provided with an annular braking surface, said mechanism comprising at least three friction brake elements arranged in spaced relation around said member and adapted to frictionally engage said surface for braking said truck, a lever having a pivotal connection with one of said brake elements and operative to apply force thereto for forcing same into braking engagement with said surface, and means pivotally connected to said lever at a point remote from said connection and pivotally connected to another of said brake elements and operative by said actuating means for applying an equal force to the other brake element and for applying a component of said force to the third brake element for actuating same.

6. A brake mechanism for a railway vehicle truck having a rotatable member adapted to be braked for braking said truck and provided with an annular braking surface, said mechanism comprising at least three friction brake elements arranged in spaced relation around said member and adapted to frictionally engage said surface for braking said truck, a toggle mechanism operatively connected at one end to one of said brake elements and at the opposite end to another of said brake elements and having its knee operatively connected to the third brake element, and means for applying force at one point in said toggle mechanism for actuating same to effect movement of all of said brake elements into braking engagement with said surface.

7. A brake mechanism for a railway vehicle truck having a rotatable member adapted to be braked for braking said truck and provided with an annular braking surface, said mechanism comprising at least three friction brake elements arranged in spaced relation around said member and adapted to frictionally engage said surface for braking said truck, a toggle mechanism operatively connected at one end to one of said brake elements and at the opposite end to the other of said brake elements, a member connecting the knee of said toggle mechanism to the third brake element, and means for applying force to one end of said toggle mechanism for actuating same to effect movement of all of said brake elements into braking engagement with said surface.

8. A brake mechanism for a railway vehicle truck having a rotatable member adapted to be braked for braking said truck and provided with an annular braking surface, said mechanism comprising at least three brake elements, two of which are arranged in clasp relation at opposite sides of said rotatable member and below the horizontal center-line thereof and the third of which is disposed above said rotatable member on the vertical center-line thereof, a toggle mechanism connected at its opposite ends to said clasp arranged brake elements and having its knee disposed above the axis of said rotatable member and operatively connected to said third brake element, and means connected to said toggle mechanism for actuating same to force all of said brake elements into braking engagement with said surface.

9. A brake mechanism for a railway vehicle truck having a rotatable member adapted to be braked for braking said truck and provided with an annular braking surface, said mechanism comprising at least three brake elements, two of which are arranged in clasp relation at opposite sides of said rotatable member and below the horizontal center-line thereof, and the third of which is disposed above said rotatable member on the vertical center-line thereof, live and dead brake levers connected to said clasp arranged brake elements, actuating means for operating said live lever, and means connecting said live lever to said dead lever and third brake element and operative by said live lever to force all of said brake elements into braking engagement with said surface.

10. A brake mechanism for a railway vehicle truck having a rotatable member adapted to be braked for braking said truck and provided with an annular braking surface, said mechanism comprising at least three brake elements, two of which are arranged in clasp relation at opposite sides of said rotatable member and below the horizontal center-line thereof, and the third of which is disposed above said rotatable member on the vertical center-line thereof, live and dead brake levers connected to said clasp arranged brake elements, actuating means for operating said live lever, and a toggle mechanism connected at one end to said live lever and at the opposite end to said dead lever and at its knee to said third brake element and operative upon operation of said live lever to move all of said brake elements into braking engagement with said surface.

11. A brake mechanism for a railway vehicle truck having a rotatable member adapted to be braked for braking said truck and provided with an annular braking surface, said mechanism comprising at least three brake elements, two of which are arranged in clasp relation at opposite sides of said rotatable member and below the horizontal center-line thereof, and the third of which is disposed above said rotatable member on the vertical center-line thereof, live and dead brake levers connected to said clasp arranged shoes, actuating means for operating said live lever, a toggle mechanism comprising oppositely disposed and diagonally arranged arms connected at their opposite ends to said live and dead brake levers respectively and having their other ends disposed adjacently to each other above the axis of said rotatable member, and a link pivotally connected at one end to said third brake element and at the opposite end to said adjacent ends of said arms, said toggle mechanism being operative by said live lever upon actuation thereof to effect movement of said brake elements into braking engagement with said surface.

12. A brake mechanism for a railway vehicle truck having a rotatable member adapted to be braked for braking said truck and provided peripherally thereof with a braking surface, said mechanism comprising at least three friction brake elements arranged in spaced relation around said member and adapted to frictionally engage said surface for braking said truck, a toggle mechanism operatively connected at its opposite ends to two of said brake elements and having its knee operatively connected to the third brake element, said toggle mechanism being operative to effect movement of all of said brake elements into braking engagement with said rotatable member, said two brake elements being movable out of engagement with said rotatable member, stop means for limiting movement of said two brake elements away from said rotatable member to render said toggle mechanism effective to release the third brake element from the said rotatable member, and actuating means for controlling the operation of said toggle mechanism.

13. A brake mechanism for a railway vehicle truck having a rotatable member adapted to be braked for braking said truck and provided peripherally thereof with a braking surface, said mechanism comprising at least three friction brake elements arranged in spaced relation around said member and adapted to frictionally engage said surface for braking said truck, a toggle mechanism connected at its opposite ends to said two brake elements and at its knee to the third brake element, said toggle mechanism being operative upon straightening movement thereof to effect movement of all of said brake elements into braking engagement with said rotatable member and operative upon partial collapse to effect movement of said two brake elements out of engagement with said rotatable member, stop means for limiting movement of said two brake elements away from said rotatable brake element for thereby rendering the knee portion of said mechanism operative upon further collapse to move said third brake element out of engagement with said rotatable member, and actuating means for said toggle mechanism.

14. A brake mechanism for a railway vehicle truck having a rotatable member adapted to be braked for braking said truck and provided peripherally thereof with a friction braking surface, said mechanism comprising a pair of oppositely disposed brake elements arranged in clasp relation at opposite sides of said rotatable member, a third brake element disposed about the braking surface of said rotatable member substantially mid-way between said two brake elements, a hanger for supporting each of said two brake elements, a live lever pivotally connected to one of said two brake elements, a dead lever pivotally connected to the other of said two brake elements, an operating mechanism operatively connecting said levers together and to said third brake element, and means for operating said live lever to effect operation of said mechanism to control movement of all of said brake elements into and out of braking engagement with said rotatable member.

15. A brake mechanism for a railway vehicle truck having a rotatable member adapted to be braked for braking said truck and provided peripherally thereof with a braking surface, said mechanism comprising at least three brake elements for braking said rotatable member, two of said elements being arranged in clasp relation at opposite sides of said rotatable member and the third brake element being located above said rotatable member on the vertical center-line thereof, means for supporting said two clasp arranged brake elements in braking relation with said rotatable member, a dead lever having a fulcrum connection with one of said two clasp arranged brake elements, a live lever having a fulcrum connection with the other of said two clasp arranged brake elements, a pair of diagonally and oppositely disposed arms having their opposite ends pivotally connected to said live and dead levers respectively and having their other ends adjacently disposed, means operatively connecting the adjacently disposed ends of said arms to said third brake element, means for operating said live lever to effect operation of said arms to move all of said brake elements into braking engagement with said rotatable member and for rendering said two clasp arranged brake elements movable out of engagement with said rotatable member, and means for limiting movement of said two clasp arranged brake elements away from said rotatable member to a degree whereby further operation of said live lever and arms is operative to effect movement of said third brake element out of engagement with said rotatable member.

16. A brake mechanism for a railway vehicle truck having a rotatable member adapted to be braked for braking said truck and provided with a peripheral braking surface, said brake mechanism comprising at least three brake elements adapted to frictionally engage said surface, two of said brake elements being arranged at opposite sides of said rotatable member in clasp relation and the third brake element being disposed above said rotatable member on the vertical center-line thereof, means for supporting said two clasp arranged brake elements from said truck, a dead brake lever operatively connected to one of said two clasp arranged brake elements, a live brake lever operatively connected to the other of said two clasp arranged brake elements, a toggle mechanism connected at its opposite ends to said levers, means connecting the knee of said toggle mechanism to said third brake element, and means for operating said live brake lever and thereby said toggle mechanism for effecting movement of all of said brake elements into and out of braking engagement with said rotatable member, means for limiting movement of said two clasp arranged brake elements away from said rotatable member by said toggle mechanism for rendering said toggle mechanism operative to move said third brake element out of engagement with said rotatable members, and means connecting said third brake element to said truck for holding same against movement with said rotatable member when in frictional braking engagement therewith.

17. A brake mechanism for a railway vehicle truck having a rotatable member adapted to be braked for braking said truck and provided peripherally thereof with a friction braking surface, said mechanism comprising at least three friction brake elements for braking engagement with said rotatable member, two of said elements being disposed at opposite sides of said rotatable member in clasp relation and the third brake element being disposed above said rotatable member, live and dead levers connected to said two clasp arranged brake elements, a toggle mechanism connected at its opposite ends to said levers and at its knee to said third brake element, a brake cylinder device carried by said truck and comprising a piston connected to said live brake lever, said piston being operative by fluid under pressure to effect operation of said live brake lever and thereby said toggle mechanism and dead brake lever to effect movement of all of said brake elements into braking engagement with said rotatable member, and a spring operative upon the release of fluid under pressure acting on said piston for effecting operation of said live lever and thereby said toggle mechanism and dead lever to effect movement of said brake elements out of engagement with said rotatable member.

18. A brake mechanism for a railway vehicle truck having a rotatable member adapted to be braked for braking said truck and provided peripherally thereof with a friction braking surface, said mechanism comprising at least three friction brake elements for braking engagement with said rotatable member, two of said elements being disposed at opposite sides of said rotatable member in clasp relation and the third brake element being disposed above said rotatable member, live and dead levers connected to said two clasp arranged brake elements, a toggle mechanism connected at its opposite ends to said levers and at its knee to said third brake element, a brake cylinder device carried by said truck and comprising a piston connected to said live brake lever, said piston being operative by fluid under pressure to effect operation of said live brake lever and thereby said toggle mechanism and dead brake lever to effect movement of all of said brake elements into braking engagement with said rotatable member, and a spring in said brake cylinder device acting on said piston, said spring being operative upon the release of fluid under pressure acting on said piston for effecting operation of said live lever and thereby of said toggle mechanism and said dead lever to effect movement of all of said brake elements out of engagement with said rotatable members.

19. A brake mechanism for a railway vehicle truck having a truck frame, an axle carrying said frame and a rotatable member to be braked secured to rotate with said axle and provided peripherally thereof with a friction braking surface, said mechanism comprising at least two brake shoes arranged at opposite sides of said rotatable member in clasp braking relation and a third brake element arranged above said rotatable member for braking engagement therewith, a hanger for each of said two clasp arranged brake elements connected to said truck frame for supporting said two brake elements from said frame, a dead brake lever connected to one of said two clasp arranged brake elements at one end and at its opposite end to said frame, a live brake lever connected at one end to the other of said two clasp arranged brake elements, a toggle mechanism connected at its opposite end to said levers intermediate the ends of said levers and connected at its knee to said third brake element, a brake cylinder device carried by said frame and operatively connected to said live lever for effecting operation thereof and thereby of said toggle mechanism and dead lever to effect movement of all of said brake elements into braking engagement with said rotatable member, means for operating said live lever to effect operation of said toggle mechanism and thereby of said dead lever to effect movement of all of said brake elements out of engagement with said rotatable member, and a rigid link connected at one end to said third brake element and at the opposite end to said truck frame for holding said brake element against turning with said rotatable member when in frictional braking engagement therewith.

20. A brake mechanism for a railway vehicle truck having a truck frame, an axle carrying said frame and a rotatable member to be braked secured to rotate with said axle and provided peripherally thereof with a friction braking surface, said mechanism comprising at least two brake shoes arranged at opposite sides of said rotatable member in clasp braking relation and a third brake element arranged above said rotatable member for braking engagement therewith, a hanger for each of said two clasp arranged brake elements connected to said truck frame for supporting said two brake elements from said frame, a dead brake lever connected to one of said two clasp arranged brake elements at one end and at its opposite end to said frame, a live brake lever connected at one end to the other of said two clasp arranged brake elements, a toggle mechanism connected at its opposite end to said levers intermediate the ends of said levers and connected at its knee to said third brake element, a brake cylinder device carried by said frame and operatively connected to said live lever for effecting operation thereof and thereby of said toggle mechanism and dead lever to effect movement of all of said brake elements into braking engagement with said rotatable member, means for operating said live lever to effect operation of said toggle mechanism and thereby of said dead lever to effect movement of all of said brake elements out of engagement with said rotatable member, and stop means associated with said truck frame and disposed to be engaged by said hangers upon a predetermined movement of said two clasp arranged brake elements away from said rotatable member for rendering said toggle mechanism operative upon further release operation of said live lever to move said third brake element away from said rotatable member.

RANKIN J. BUSH.
WILLIAM H. GLASS.